(No Model.)
J. F. ALBEE.
THILL COUPLING.
No. 305,991. Patented Sept. 30, 1884.
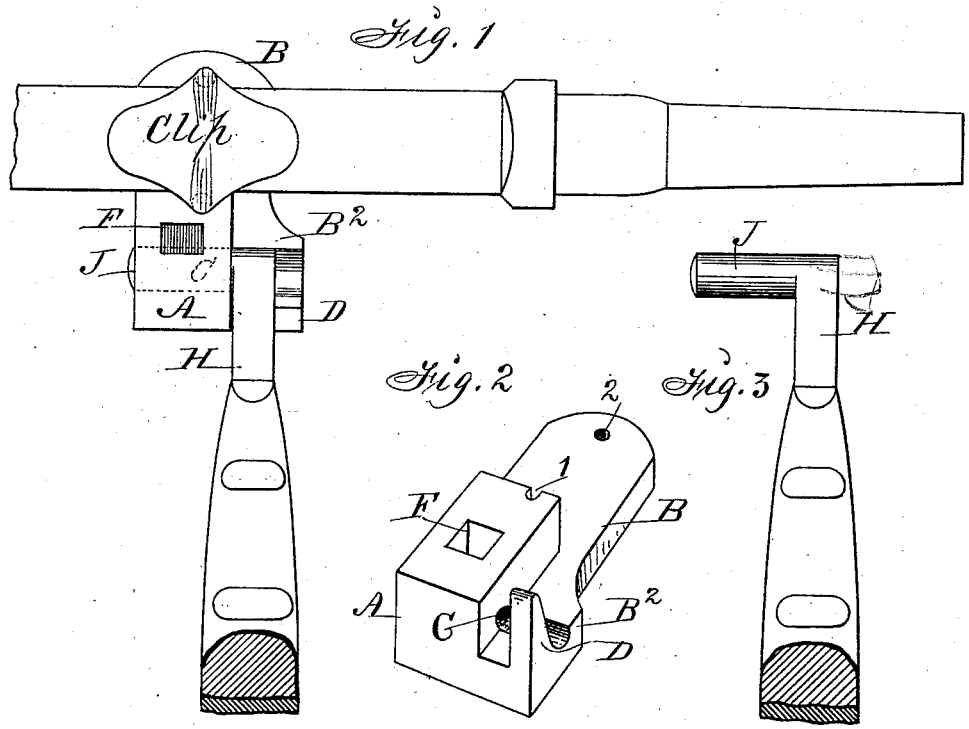
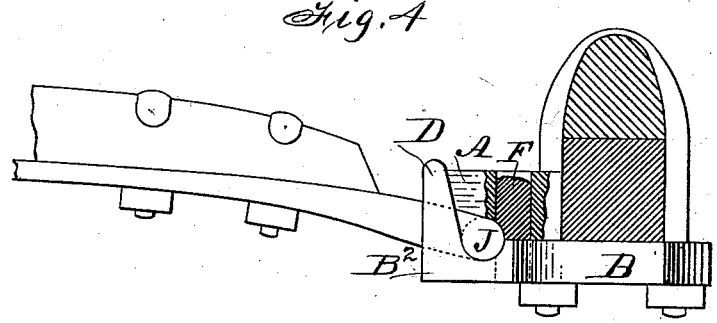
Witnesses:
M. Anderson.
Ora C. Moore.
Inventor:
John F. Albee
By Thomas G. Orwig, Atty.

UNITED STATES PATENT OFFICE.

JOHN F. ALBEE, OF NEWTON, IOWA, ASSIGNOR OF ONE-HALF TO
J. R. GORRELL, OF SAME PLACE.

THILL-COUPLING.

SPECIFICATION forming part of Letters Patent No. 305,991, dated September 30, 1884.

Application filed April 21, 1884. (No model.)

*To all whom it may concern:*

Be it known that I, JOHN F. ALBEE, of Newton, in the county of Jasper and State of Iowa, have invented an Improved Thill-Coupling, of which the following is a specification.

Thill-couplings adapted to be fixed to the axle of a vehicle by means of clips of common form have heretofore been made and provided with cavities and sockets for first receiving rubber plugs and then cross-heads or pintles that extended at right angles from thill-irons; but it is often difficult to compress a plug in a cavity so as to allow the pintle to enter its socket, and my object is to overcome the difficulty by forming and combining a coupling, a thill-iron, and a rubber plug, as hereinafter fully set forth, in such a manner that the pintles can be readily first placed in their sockets and the rubber plugs then placed in their cavities to engage the pintles and to prevent the complete coupling from making any noise when in use.

Figure 1 of my accompanying drawings is a top view of my coupling attached to a section of an axle. Fig. 2 is a perspective view of the part adapted to be fixed to an axle. Fig. 3 shows the thill-iron fixed to the end of a wooden shaft. Fig. 4 is a side view of my complete device combined with a carriage-axle and a shaft.

Jointly considered, these figures clearly illustrate the construction, application, and operation of my complete invention.

A is a metal block of oblong form, that may vary in size as desired.

B is a plate that projects rearward from the lower edge of the block, to extend under an axle. It has perforations Nos. 1 and 2, through which the ends of a clip of common form are passed to fasten the block A rigidly to the axle, as clearly shown in Figs. 1 and 4.

C is a transverse bore formed in the front portion of the block.

D is a vertical projection and guard, that rises from the lateral and forward extension, $B^2$, of the plate B.

F is a vertical bore, preferably of angular shape, that intersects the transverse bore C and forms a seat for a rubber plug or cushion, G.

H represents a thill-iron that is adapted to be fixed to a shaft by means of T-bolts in a common way.

J is a pintle formed on the end of the iron H, to extend laterally at right angles, as clearly shown in Fig. 3.

To connect the shaft or pole of a vehicle with my devices when fixed in their respective places, as shown and described, I simply hold the shaft or pole in a perpendicular position and pass the pintles J into the bores C in rear of the guards D, and then turn the shafts or pole forward and downward to allow the rear portions of the thill-irons H to enter and rest between the guards D and the block A. By then simply inserting elastic plugs G in the openings F they will come in contact with the pintles J in the bores or bearings C and prevent noise.

To disconnect a pair of shafts or a pole, (as frequently required in interchanging,) I simply move the same in reverse ways from the motions thereby made in connecting them.

The metal block A, and the parts B and D formed integral therewith, may be made by casting in a mold or forged of wrought metal.

I claim as my invention—

The coupling device consisting of the parts A B C D, formed integral with each other and provided with a horizontal bore, C, and an open-topped cavity, F, intersecting the bore C and adapted to receive and retain a rubber plug, and a thill-iron, H J, adapted to engage the part D after the pintle J has entered the bore C, constructed and combined with a vehicle substantially as shown and described, to operate in the manner set forth.

JOHN F. ALBEE.

Witnesses:
H. S. WINSLOW,
CLARK VARNUM.